D. W. BABB.
VEHICLE.
APPLICATION FILED APR. 8, 1919.
1,316,408.
Patented Sept. 16, 1919.
3 SHEETS—SHEET 3.
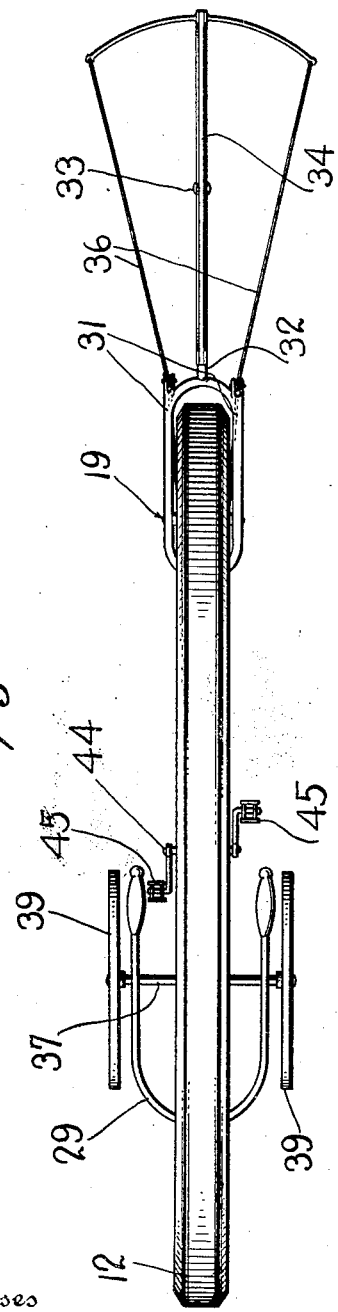
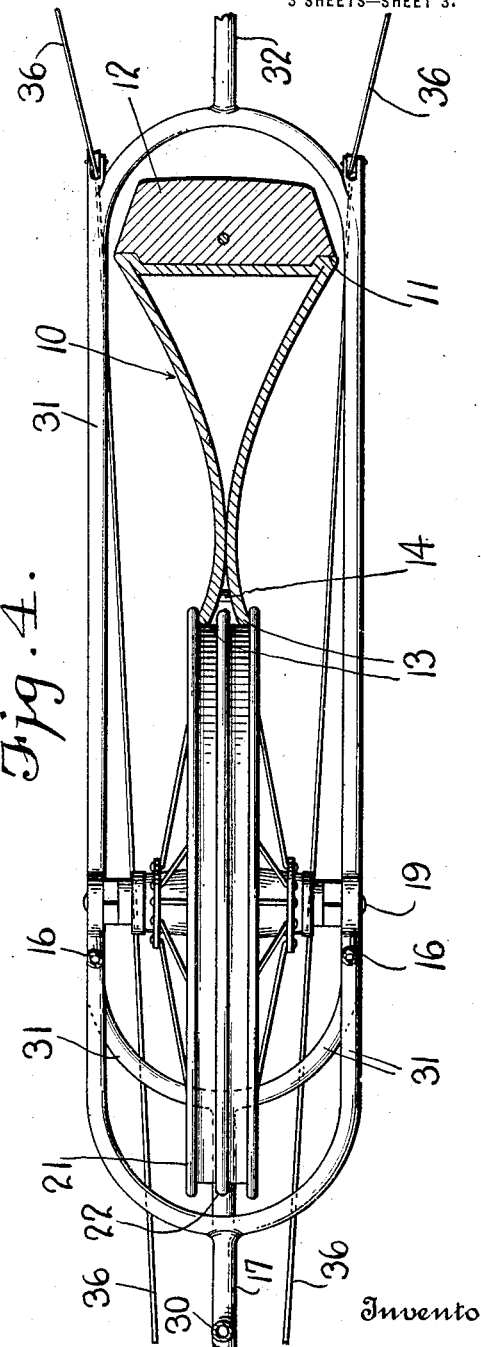
Witnesses
Lo. B. James
Inventor
D. W. Babb
By Victor J. Evans
Attorney

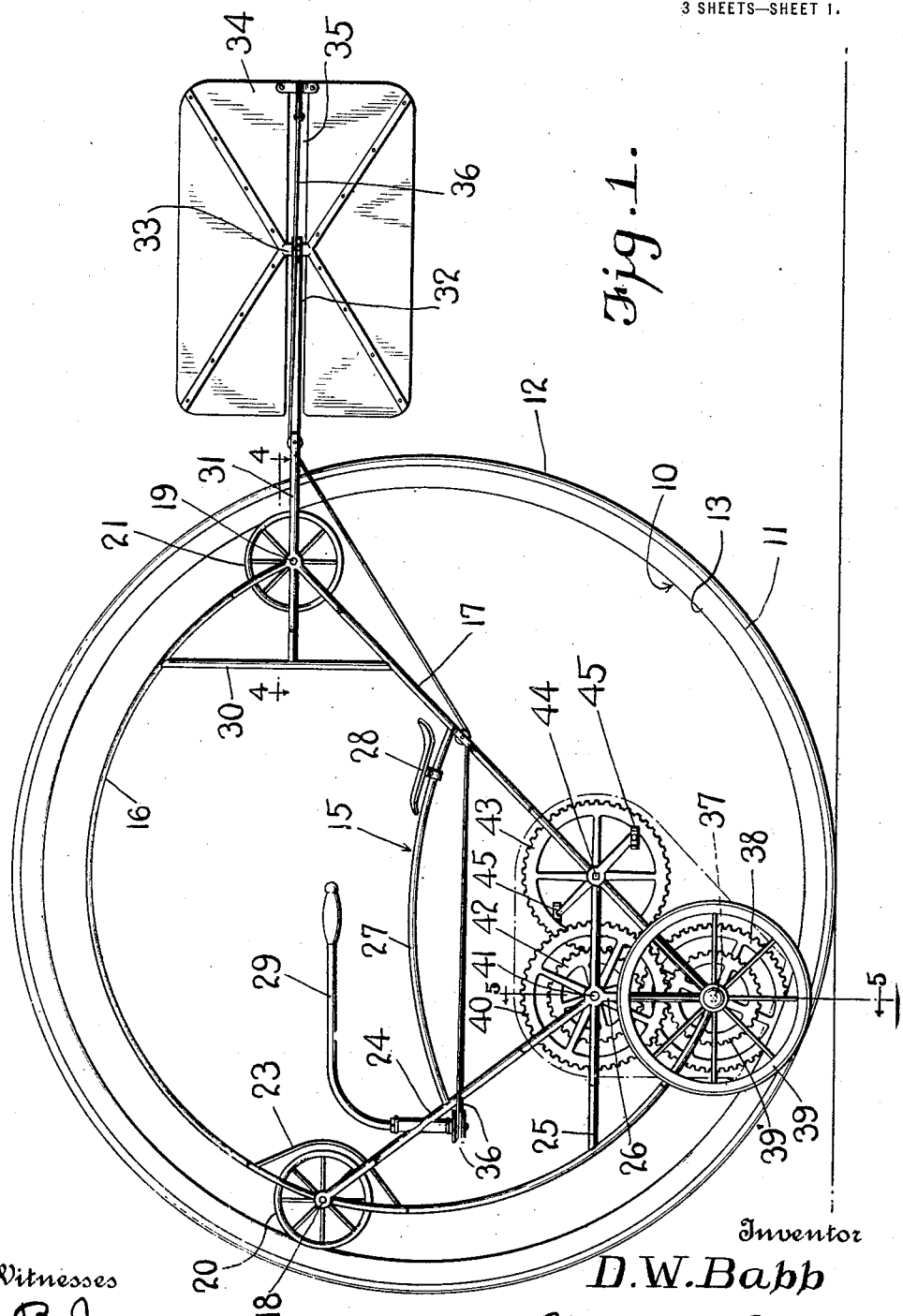

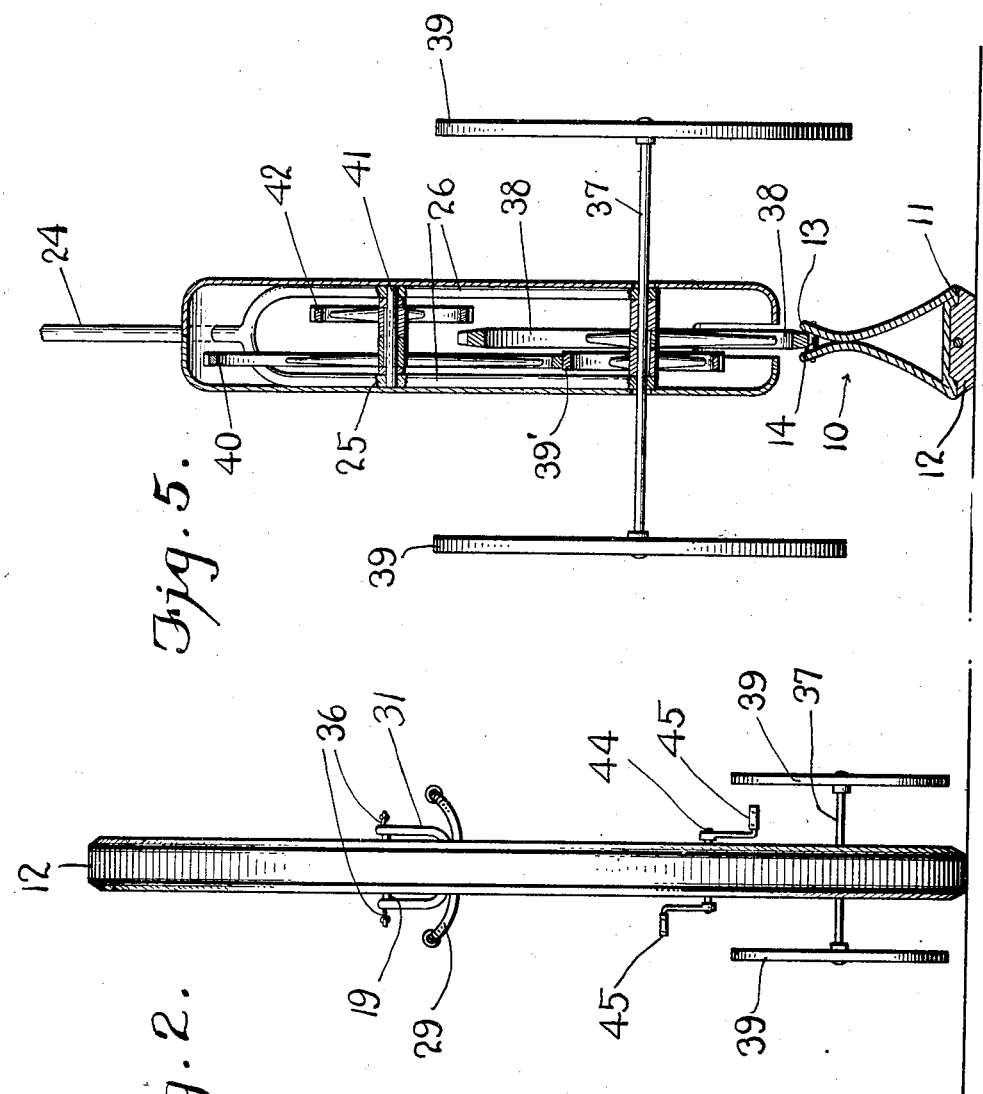

UNITED STATES PATENT OFFICE.

DELMAR W. BABB, OF WESTPOINT, VIRGINIA.

VEHICLE.

1,316,408.  Specification of Letters Patent.  Patented Sept. 16, 1919.

Application filed April 8, 1919. Serial No. 288,447.

*To all whom it may concern:*

Be it known that I, DELMAR W. BABB, a citizen of the United States, residing at Westpoint, in the county of King William and State of Virginia, have invented new and useful Improvements in Vehicles, of which the following is a specification.

This invention has reference to improvements in pedal propelled vehicles and is in the nature of a unicycle.

The primary object of the invention is to produce a practical vehicle of this character which may be safely ridden, properly guided and propelled at desired rates of speed in an easy and convenient manner.

A further object of the invention is to produce a unicycle comprising a ring member that may have on its outer periphery a compressible tread, its inner periphery being provided with teeth that are engaged by one of a number of intermeshing gears that have their shafts journaled on a suitable frame arranged in the ring, one of said gears being provided with pedals, the frame supporting guide wheels which engage with the ring to hold the frame therein and the gear in proper mesh with the teeth of the ring. The frame also supports a saddle for the rider and has secured thereon handle bars which are connected to a pivoted rudder supported by the frame and arranged to the rear of the ring, the said rudder being vertically disposed, and the swinging thereof by the manipulation of the handle bars causing the same to be contacted by air currents to turn the ring to guide the course thereof.

It is a further object of the invention to produce a unicycle in which the ground wheel is in the nature of a ring that has its inner edges provided with continuous flanges and between said flanges are arranged teeth, the said teeth being engaged by a toothed wheel which is in mesh with a train of such gears, and on the shaft of the outer wheel is secured the pedals for operating the device, all of the wheels having their shafts journaled in suitable bearings in a frame arranged in the ring, the shaft of the operating wheel, or that engaging with the teeth of the ring having smaller wheels on the ends thereof which, when the device is not in motion rest on the ground to support the main wheel or ring, and which, when the device is in motion are designed to be elevated above such contact with the ground, the frame also having journaled thereon the grooved guide wheels that receive in the grooves thereof the flanges of the ring, while on the frame is a slidable seat and forward of the seat is a hingedly connected handle bar, the said handle bar having the arms thereof connected by flexible elements to a vertically disposed rudder which is pivoted to an outwardly extending portion of the frame and which, when swung upon its pivot will influence the vehicle to properly guide the same, so that both the propelling and the guiding of the vehicle are under the control of the operator.

The drawings illustrate a simple and satisfactory reduction of the improvement to practice, and in the said drawings:

Figure 1 is a side elevation of the vehicle constructed in accordance with this invention.

Fig. 2 is a front elevation thereof.

Fig. 3 is a top plan view thereof.

Fig. 4 is a sectional view approximately on the line 4—4 of Fig. 1.

Fig. 5 is a sectional view approximately on the line 5—5 of Fig. 1.

The main or ground wheel of my improved unicycle is in the nature of a ring member and is designated, in the drawings, by the numeral 10. Preferably the ring 10 is widened from its sides to its outer edge or tread surface, the said widened portion being indicated by the numeral 11, and if desired, on the outer periphery of the said ring a tire 12 of a compressible nature is arranged. It is to be understood that if desired the outer periphery of the ring may be concaved to receive the tire or may be provided with clencher portions at the outer edges thereof to engage with the clencher tire, should it be desired to employ a pneumatic tire. The sides of the ring 10 are preferably arranged at an inward curvature, and the edges of the said ring, at the inner periphery thereof are provided with continuous flanges 13—13, while between the flanges the said inner periphery of the ring 10 is formed with teeth 14.

In the ring 10 is arranged a frame, broadly indicated by the numeral 15. The frame is constructed of tubing and comprises a main arched portion 16 that has its ends connected by a straight portion 17, the said straight portion being arranged angularly with respect to the ring 10 when the frame is arranged in the ring. The frame 15, at the juncture of the upper end of the straight and arched portions 17 and 16 respectively, and approximately diametrically opposite said portion, is provided with bearing openings for shafts 19 and 18 respectively, and on these shafts are journaled peripherally grooved guide wheels 20 and 21 respectively, the flanged portion 13 of the ring 10 being received in the grooves of the guide wheels. If desired, the guide wheels 20 and 21 may have arranged centrally in the groove thereof a continuous bead or flange 22 that is disposed in the groove provided between the flanges 13 of the ring 10, but out of frictional contact with such flanges. The frame, at the portions thereof receiving the axles 18 and 19 is preferably bifurcated, or the tubes welded at such portions to provide parallel members between which the wheels are received. Secured to the arched portion 16 of the frame 15 is a mud guard 23 disposed inward of the guide wheel 20, to protect the rider from contact with any dirt or mud which may gather on the said wheel 20 from its engagement with the ground wheel or ring 10. The frame 15 has an angle strut brace 24 connected to the portion thereof in which the axle 18 is journaled, the said strut brace being connected to a longitudinal brace 25. At the lower portion of the said frame is a vertically disposed brace 26. Between the strut brace 24 and the portion 17 of the frame is an arched tubular bar 27 and on this bar is arranged a slidable saddle 28. The saddle may be secured at any desired point on the bar 27. The strut brace 24, above the bar 27 has journaled thereon the central portion of the handle bars 29.

The portion of the frame at the rear thereof, that is, at the part on which the wheel 21 is journaled is suitably reinforced by brace members 30, and this portion of the frame is also preferably bifurcated or forked to receive between the forks the wheel 21. Extending from this portion of the frame are forked arms 31 which receive therebetween the ground wheel or ring 10 and which, at their outer portions are connected to a longitudinally extending centrally disposed rod or extension 32. To the rod 32 is hingedly connected, as at 33 the guide member for the vehicle. The guide member is in the nature of a rudder. The rudder 34 is preferably in the nature of a flat plate or blade and may be formed of two parts, but in any event is centrally provided with a slot or opening 35 from the rear end thereof to receive the rod 32, the pivot 33 being arranged at the center of the rudder. Connected to the opposite sides of the rudder 34 are flexible elements 36 preferably in the nature of wire members, and these members are likewise connected to the ends of the handle bar 29. It will thus be noted that the rudder is under the control of the operator of the vehicle, and when thrown to the wind at desired angles with respect to the body portion of the vehicle will guide the same so that the vehicle may be accurately steered.

The lower end of the frame 15 has journaled thereon a shaft 37. Keyed to the shaft 37 is a toothed wheel 38. This wheel has its teeth beveled from their outer surfaces to the sides of the wheel so that the periphery of the said wheel is snugly received in the substantially V-shaped or beveled groove provided between the flanges 13 of the ring 10, the teeth of the wheel 38 co-engaging with the teeth 14 of the ring. The axle 37 extends a suitable distance beyond the sides of the device, and secured on these ends are wheels 39—39. The wheels 39 are designed to rest on the ground over which the vehicle travels, when the vehicle is not in motion, but, as will hereinafter be apparent, will be elevated above such ground contact when the vehicle is in motion. On the shaft 37, to one side of the toothed wheel 38 is a gear 39' meshing with a toothed wheel 40 journaled on an axle 41 mounted in suitable bearings in the frame 15 at the juncture of the braces 24, 25 and 26, and on the said shaft, to one side of the wheel 40 is a pinion 42. The pinion meshes with the main toothed or sprocket wheel 43 that is secured on a shaft 44 journaled in suitable bearing openings at the juncture of the brace 25 with the straight member 17 of the frame 15. The shaft 44 has its ends extending outward of the frame 15 and the said ends bent or otherwise provided with crank pedal members 45.

When the rider seats himself on the saddle the frame 15 will, upon the proper adjustment or movement of the rider turn a slight distance around the wheel 10 sufficient to bring the wheels 39 out of ground contact. The pedals are operated in the usual manner by the feet of the rider so that the intermeshing train of gears impart motion to the toothed wheel 38 which meshing with the teeth in the ground wheel or ring 10 revolves the said ring, and in this manner the vehicle may be accurately propelled at rates of speed suited to the rider.

It will be apparent that owing to the great diameter of the main ground wheel or ring 10, and the rapidity of motion imparted thereto by the intermeshing gears, great speed may be obtained, if desired. The vehicle, as above stated, may be accurately guided by swinging the rudder on its pivot, and from the foregoing description, when taken in connection with the drawings the simplicity of the construction and the advantages thereof will be apparent without further detailed description.

Having thus described the invention, what is claimed as new is:—

1. In a unicycle, a ground wheel in the nature of a ring having continuous flanges at the inner edges thereof and teeth between the flanges, a frame in the ring, grooved guide wheels journaled thereon and receiving in the grooves thereof the inner periphery of the ring, a plurality of intermeshing gears journaled on the frame, pedals on the shaft of one of the gears, a saddle supported by the frame above said gear, and another of said gears received between the flanges of the ring and meshing with the teeth thereof.

2. In a unicycle, a ground wheel comprising a ring member having continuous flanges at its inner edges and teeth between the flanges, a frame in the ring, a series of intermeshing gears having their shafts journaled in bearings in the frame, pedals on the shaft of one of the gears, another of said gears being received between the flanges of the ring and meshing with the teeth of the ring between said flanges, wheels on the ends of the shaft of the last mentioned gear, a longitudinally adjustable saddle supported by the frame above the gears, and grooved guide wheels journaled on the frame and receiving in the grooves the inner periphery of the ring.

3. In a unicycle, a ground wheel comprising a ring member having continuous flanges on the inner edges thereof and teeth between the flanges, a frame in the ring, intermeshing gears having their shafts journaled on the frame, the shaft of one of said gears having pedals thereon, another gear being received between the flanges of the ring and meshing with the teeth thereof, said last mentioned gear having a laterally extending shaft, wheels journaled on the ends thereof, grooved guide wheels on the frame receiving in the grooves thereof the inner periphery of the ring, a longitudinally adjustable saddle on the frame, a pivoted rudder supported on the frame outward of the ring, and means on the frame forward of the saddle and connected with the rudder for operating the same.

4. In a unicycle, a ground wheel comprising a ring member widened from its sides to its tread surface and having its inner periphery provided at its edges with outstanding continuous flanges, and teeth on the ring between the flanges, a frame in the ring, a series of intermeshing gears having their shafts journaled on said frame, pedals on the shaft of one of the gears, wheels on the ends of the shaft of the gear nearest the ring, and said gear being received between the flanges of the ring and meshing with the teeth thereof, wheels on the ends of the last mentioned shaft, a longitudinally adjustable saddle supported for slidable movement on the frame above the gears, centrally pivoted handle bars on the frame opposite the saddle, grooved guide wheels on the frame and receiving in the grooves thereof the flanges of the ring, said wheels having continuous beads in the grooves thereof received between the flanges of the ring, said frame having a portion thereof extending outward of the ring, a rudder pivotally secured to said portion, and flexible elements secured to the opposite sides of the rudder and to the ends of the handle bars.

In testimony whereof I affix my signature

DELMAR W. BABB.